United States Patent
Bliss et al.

(10) Patent No.: US 7,835,806 B2
(45) Date of Patent: Nov. 16, 2010

(54) METHOD FOR INDIRECT ACCESS TO CONTROLLER DATA USING NAME STORED IN STRING TAG

(75) Inventors: Ronald E. Bliss, Twinsburg, OH (US); David A. Johnston, Mentor, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 840 days.

(21) Appl. No.: 11/668,051

(22) Filed: Jan. 29, 2007

(65) Prior Publication Data

US 2008/0183976 A1 Jul. 31, 2008

(51) Int. Cl.
*G06F 13/14* (2006.01)
*G06F 12/00* (2006.01)
*G05B 11/01* (2006.01)

(52) U.S. Cl. .................. 700/24; 711/154; 711/221; 712/225

(58) Field of Classification Search .......... None
See application file for complete search history.

(56) References Cited

U.S. PATENT DOCUMENTS 6,826,669 B1 * 11/2004 Le et al. .................. 711/173
2003/0016419 A1 * 1/2003 Palmer et al. ............ 359/154

\* cited by examiner

*Primary Examiner*—Gary J Portka
(74) *Attorney, Agent, or Firm*—Turocy & Watson LLP; R. Scott Speroff; John M. Miller

(57) ABSTRACT

A controller can process an instruction directed to the controller itself to access data in the memory of the controller dynamically at runtime, where the data can be indirectly accessed by referencing a tag name, associated with the data and a memory space in memory, which can be included in a string tag associated with the instruction. Multiple tags, each tag associated with a respective item of data, can be located or referenced dynamically at runtime to access the respective items of data where one tag can be associated with a first structure, array, and/or scope and a disparate tag can be associated with a disparate structure, array, and/or scope, via an instruction.

20 Claims, 9 Drawing Sheets

METHOD FOR INDIRECT ACCESS TO CONTROLLER DATA USING NAME STORED IN STRING TAG

TECHNICAL FIELD

The subject invention relates to industrial control systems and, more particularly, to optimizing retrieval and/or usage of data from a controller.

BACKGROUND

Due to advances in computing technology, businesses today are able to operate more efficiently when compared to substantially similar businesses only a few years ago. For example, internal networking enables employees of a company to communicate instantaneously by email, quickly transfer data files to disparate employees, manipulate data files, share data relevant to a project to reduce duplications in work product, etc. Furthermore, advancements in technology have enabled factory applications to become partially or completely automated. For instance, operations that once required workers to put themselves proximate to heavy machinery and other various hazardous conditions can now be completed at a safe distance therefrom.

While various advancements have been made with respect to automating an industrial process, utilization and design of controllers have been largely unchanged. In more detail, industrial controllers have been designed to efficiently undertake real-time control. For instance, conventional industrial controllers receive data from sensors and, based upon the received data, control an actuator, drive, or the like. These controllers recognize a source and/or destination of the data by way of a symbol and/or an address associated with the source and/or destination. Further, industrial controllers can include communications ports and/or adaptors; and sensors, actuators, drives, and the like, are communicatively coupled to such ports/adaptors. Thus, a controller can recognize device identity when data is received and further deliver control data to an appropriate device.

As can be noted from the above, data associated with conventional industrial controllers can be created, delivered, and/or stored with a flat physical address space. In other words, all that can be discerned by reviewing data received and/or output by a controller is the memory location where the data for an actuator or sensor and a status resides. Further, a descriptive name or tag can be associated with data in the memory of the controller, where the tag can be referenced as opposed to a flat physical address.

Conventionally, tags can be fixed at design time and changed with a runtime edit. Further, typically, where symbolic addressing (e.g., tag references) is used, a controller cannot execute an instruction to access data within the controller dynamically at runtime. It may be desirable to access (e.g., read/write) data within the controller itself dynamically at runtime, while the controller executes.

Further, memory in a controller may be segmented into isolated areas known as scopes whereby access to tag data in each scope is limited to the application program instructions embedded within code contained in the same scope. Traditionally, data that must be accessed by code within multiple areas or scopes must be placed into a global area that is commonly accessible. This can create complications if tag names are reused across the global and controller areas. It is desirable for application code contained in one program scope to be able to access data in another program scope without having to revert to a controller scoped tag implementation.

SUMMARY

The following presents a simplified summary of the disclosed subject matter in order to provide a basic understanding of some aspects described herein. This summary is not an extensive overview, and is not intended to identify key/critical elements or to delineate the scope of the disclosed subject matter. Its sole purpose is to present some concepts in a simplified form as a prelude to the more detailed description that is presented later.

The disclosed subject matter relates to systems and/or methods that facilitate indirect access of data in a controller. In accordance with one aspect of the disclosed subject matter, a tag management component can be employed to generate a tag name that can be associated with data written to or read from a memory within a controller, such as a programmable logic controller (hereinafter referred to as "PLC"). The tag management component can also facilitate associating the tag name with the memory space in memory where the data is accessed (e.g., read, written). The data associated with the tag name can then be accessed from the memory space via an instruction that references a string tag that can contain the tag name, where, for example, data in the string tag can contain a combination of characters (e.g., ASCII) that represent the name of the tag that is to be accessed, as opposed to referencing the physical memory space/address directly.

In accordance with another aspect, a controller can process an instruction contained on the controller itself, as opposed to another controller or device, and access data by including the tag name in a string tag associated with the instruction, so that access (e.g., read, write) request can be performed dynamically at runtime. For example, a tag name can be associated with a tag (e.g., tag object), data, and/or a physical memory space to which the data can be accessed (e.g., written, read). An instruction can be written so that a read or write request associated with the instruction can be executed within the controller itself. The name of the tag being requested can be included in the data of a string tag associated with the instruction. During runtime, the instruction can be executed and an access component can locate the name of the desired tag in the string tag. A tag management component can facilitate referencing the tag name in a symbol table (e.g., look-up table, data table) to identify the tag object and information associated therewith (e.g., memory address, data value). The information can be provided to the access component, so the access component can access the associated data to/from the physical memory space associated with the tag name dynamically at runtime. The controller can thereby indirectly access data associated with the tag dynamically at runtime using the tag name without any predefined knowledge of the desired tags physical location within memory.

In accordance with yet another aspect of the disclosed subject matter, multiple tags can be spanned dynamically at runtime to access data in different structure members and/or different arrays from the same instruction. For example, a tag name can be stored in the data of a string tag, where the tag name can be associated with data and a memory space within a first array in the memory in a controller where the data can be accessed. When the controller executes the instruction to access the data, the access component can recognize or perceive the tag name in the data of a string tag. The tag management component can reference the tag name. The access component can then access the data associated therewith in the first array. Subsequently, another tag name can be included in the data of a string tag associated with the instruction, where the other tag name is associated with data stored in another array. The next time the controller executes the instruction, an access component can recognize the other tag name in the data of the string tag. The tag management component can reference the other tag name and the data associated therewith in the other array. Further, structures, which can contain multiple data members or elements, can be spanned so that respective data members of different structures can be accessed dynamically at runtime. Each data member can be assigned an individual name, and a data value associated with a data member can be accessed by referencing its associated name in string tag data associated with an instruction. Subsequently, another data member (e.g., structure element) can be accessed using the same instruction, where the string tag data can include the name associated with the other data member. Thus, spanning multiple tags, different structure elements, and different arrays with the same instruction can all be accomplished dynamically at runtime.

In yet another aspect, a controller can access items of data, each associated with different scopes, by spanning the different scopes dynamically at runtime. Memory in the controller may be segmented into isolated areas known as scopes (e.g., controller scope, program scope). Conventionally, access to data associated with a tag(s) in each scope is limited to the application program instructions embedded within code contained in the same scope. Thus, data that must be accessed by code within multiple data areas or scopes must be placed into a global area that is commonly accessible. This can create complications if tag names are reused across the global and controller areas. The disclosed subject matter can facilitate spanning different scopes dynamically at runtime by referencing a tag name in string data. As tag names used within one program scope may be reused by or overlap with tag names of another program scope, in order to avoid name collisions, both the name of the program scope and the name of the tag can be specified in string data. The string data can be loaded in an instruction, and the instruction can be used to perform a runtime lookup of the tag name and the program name (e.g., scope) stored in the string data and return the data associated with the tag, thereby enabling both dynamic access (e.g. read/write) and scope spanning or data area spanning. Thus, the need to locate information in the global area can be reduced as well as and the need to rename tags to prevent name collisions.

To the accomplishment of the foregoing and related ends, certain illustrative aspects of the invention are described herein in connection with the following description and the annexed drawings. These aspects are indicative, however, of but a few of the various ways in which the principles of the disclosed subject matter can be employed and the disclosed subject matter is intended to include all such aspects and their equivalents. Other advantages and distinctive features of the disclosed subject matter will become apparent from the following detailed description of the disclosed subject matter when considered in conjunction with the drawings.

DETAILED DESCRIPTION

Figure 1:
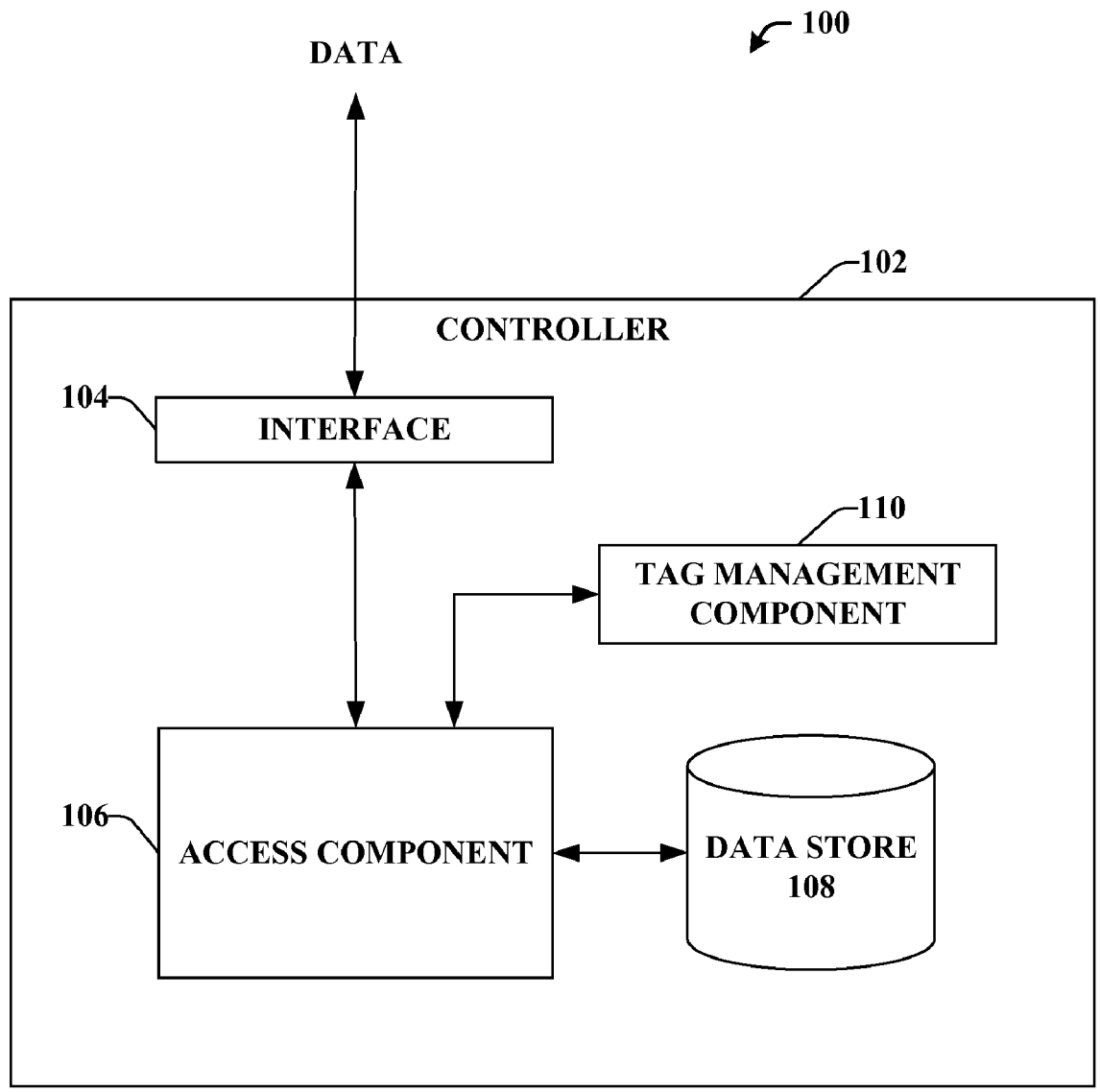
FIG. 1 illustrates a block diagram of a system that facilitates access of data within a controller in accordance with the disclosed subject matter.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that such matter can be practiced without these specific details. In other instances, well-known structures and devices are shown in block diagram form in order to facilitate describing the subject matter disclosed herein.

With certain industrial controllers, a tag can be employed to be associated with data in memory, where the tag can be referenced to provide access to the data, as opposed to referencing a flat physical address. Conventionally, tags can be fixed at design time and changed with a runtime edit. However, it would be advantageous to store the name of a tag in the data of a string tag, and then, during runtime, use an instruction to perform a runtime lookup and return the data associated with the tag, thereby enabling dynamic access (e.g., read/write) with regard to data associated with the tag within the controller itself, while the controller executes. Further, the ability to access multiple tags using one instruction in order to read or write different structure members and/or items of data to/from different arrays dynamically during runtime may be desirable for reasons such as efficiency. Additionally, the ability to span different isolated data areas or scopes using this same technique is desirable to again further programming efficiencies.

In accordance with the disclosed subject matter, a controller can process an instruction contained within the controller itself to access items of data in the memory of the controller dynamically at runtime, where the data can be indirectly accessed by referencing a tag name, associated with the data and a memory space in memory, and where the tag name can be included in the data of a string tag associated with the instruction. Further, multiple tags can be spanned dynamically at runtime to access respective data, associated with each of the tags, in different structures and/or different memory arrays using a single instruction. Also, the controller can indirectly access respective items of data, each associated with different scopes, dynamically at runtime in order to span different scopes by referencing a tag name included in string tag data and associated with one data item in a first scope, and then referencing another tag name included in string tag data and associated with a data item in another scope.

Turning now to the drawings, FIG. 1 illustrates a system 100 that facilitates optimizing programmatic access capabilities in a controller. The system 100 can include a controller 102, such as a PLC, that can include an interface component 104 (hereinafter referred to as "interface") that can facilitate sending data to or receiving data from the controller 102. Controller 102 can further include an access component 106 that can be associated with the interface 104 and can facilitate accessing of data to/from data store 108. For example, access component 106 can receive data via the interface 104, wherein a name can be distributed from the controller 102 and the name can be associated with the data. Moreover, the access component 106 can provide programmatic access to the name and respective data space dynamically during runtime.

The access component 106 can further be associated with a tag management component 110 that can facilitate associating a tag name with a memory space in the data store 108 where the data can be accessed (e.g., read, written) by the access component 106. The tag management component 110 can generate a tag name that can be associated with a tag (e.g., tag object), and/or a physical memory space in the data store 108, as well as data being written to or read from data store 108, within the controller 102 (e.g., PLC). The tag management component 110 can also facilitate associating or linking the tag name with the tag and the memory space in the data store 108 where the data is accessed (e.g., read, written) by the access component 106. The tag can include information that can define the format or data type of the data, the physical memory space where the data can be retrieved, or where the data is to be written, metadata, as well as other information associated with the data or the memory space. The data can be accessed from the memory space via an instruction that references the string tag where the name of the desired tag can be contained in the data of the string tag, for example, as opposed to referencing the actual physical memory space/address associated with the data.

Tags can include controller scoped tags and program scoped tags, for example. Controller scoped tags can be used for sharing information that can be accessed or manipulated by multiple routines in different programs. Controller scoped tags can be accessible by all code within the controller 102. Tags that reside at controller scope can include input/output module tags, produced/consumed tags, message tags, and motion group and axis tags. Program scoped tags can typically limit access to routines within a single program in controller 102, except, for example, where multiple tags associated with different programs are spanned to access data in respective disparate structure members and/or arrays, as discussed more fully herein. Program scoped tags can provide a level of isolation between different programs due to the more limited access provided.

Data that can be associated with tags can consist of a simple atomic datatype such as a Boolean or Bit, Integer or floating point number, or compound datatypes that may be created to hold multiple data values. Structures can contain multiple data values where each data member of the structure can be assigned an individual name (e.g., tag name). Furthermore, arrays can be used to store multiple data elements of the same data type, either simple atomic or structured (e.g., compound datatype), as a list or table similar to a database where a numeric index can be used specify the specific element or record to be accessed. On a running controller, an array index can be calculated to determine the element location that is to be accessed.

Data can be stored in arrays in data store 108, for example. Regarding memory arrays, the data store 108 can be structured to comprise multiple arrays for the storage of data, where an array can be a contiguous block of memory defined to store a specific data-type as a table of repeating values in one or more dimensions, for example, although the definition of array is not so limited. In addition, the data store 108 can include user-defined arrays, where a user can create custom tables to store information. An array can be named symbolically to facilitate determining the contents and use associated with the array. Further, an array can be built using one or more dimensions (e.g., two dimensions, three dimensions, ...) to represent the data it is intended to contain, for example, although the array is not so limited. The array can be built to contain a based data type (e.g., Boolean, integer, double integer, etc.) or a structure (e.g., timer, counter, etc.), where the data type can also be defined by the user, if desired, to allow the user to mirror a process without being burdened with having to know physical memory addresses.

Array elements can be accessed using fixed or indirect references. A fixed reference can use an immediate number embedded in the instruction tag reference. For example, a fixed reference can be a hard-coded reference that cannot be changed at runtime. Validation can be performed at compile time so scan impact is minimized. Indirect references can also be used, where, for example, an indirect reference can be a tag name embedded in the instruction tag reference. Further, an indirect indexed expression reference can also be used, where a tag name can be included in a mathematical operation to determine a position in the array to be accessed at runtime. For example, if the tag name is "offset", an instruction can specify that a certain operation be performed at "offset+1". Thus, the value of "offset" will be retrieved at runtime, and 1 will be added to that value, and the resulting value can be processed in accordance with the instruction. The actual position to be accessed can be validated dynamically at runtime. This can facilitate programmatic selection of desired data dynamically at runtime.

Thus, symbolic addressing, utilizing tag names, can be used to eliminate the need to tie data to fixed memory locations. This can thereby provide a more flexible approach to program development. Further, tags that are produced/consumed can facilitate passing information from a controller to another device, such as another controller without the need for writing code to accomplish such task. Also, additional flexibility can be provided by the use of an alias tag that can be used to provide an alternate name to be associated with data.

For example, there can be a device associated with the controller 102 (e.g., PLC) that is not physically programmed to the input/output (I/O) points that the controller 102 needs to effectively control the device. A human machine interface (hereinafter "HMI"), for example, can be utilized to input the names (e.g., tag names) associated with the I/O points that need to be accessed from the data store 108 in the controller 102. Code can be executed to initiate a request (e.g., via a message instruction) within the controller to the access component 106 to read the data associated with the names, which are associated with the desired I/O points, the tag management component 110 can be utilized to look up the names in a table stored within the controller 102 to determine information linked with the names, where such information can include the respective physical memory addresses where items of data associated with the I/O points are stored, for example. The items of data can be read from those physical memory addresses in the data store 108 and returned to be utilized by the controller 102 to control the device. Thus, the desired data can be indirectly accessed from the data store 108 by use of the tag name(s) associated with the data.

In accordance with one aspect of the disclosed subject matter, the tag management component 110 can facilitate indirect access of data in the controller 102 dynamically at runtime. Thus, not only can the controller 102 access data associated with another controller (not shown) or device (not shown) at runtime, but the controller 102 can indirectly access data in the controller 102 itself dynamically at runtime. For example, code can be written that can include an instruction that specifies a read or write request for data contained in the controller 102. The name of the tag that contains the desired data can exist within the data of a string tag associated with the instruction, for example. During runtime, the controller 102 can scan the instruction and the instruction can be executed such that the tag name can be located in the data of the string tag, and the tag name can then be referenced from, for example, a symbol table in the controller 102 to determine where in the data store 108 the desired data is located (e.g., for a read request) or should be stored (e.g., for a write request). The data can be accessed dynamically at runtime by the access component 106 to/from the memory space in the data store 108 associated with the tag name and data. The controller can thereby indirectly access data associated with the tag dynamically at runtime using the tag name.

In accordance with yet another aspect of the disclosed subject matter, multiple tags can be spanned dynamically at runtime to access data in different tags, structure members and/or arrays from the same instruction. For example, a controller 102 can include code that can further include an instruction to access data to/from data store 108. A string tag can be included in the instruction, where a tag name can be stored in data of the string tag. The tag name can be associated with data and/or a memory space within a first array in the data store 108 in controller 102 where the data can be accessed. When the controller 102 executes the instruction to access the data, the instruction can locate the tag name in the string tag. The controller 102 can reference the tag from a symbol table in controller 102 to determine what location (and array) in the data store 108 to access the data associated with the tag dynamically at runtime. Subsequently, another tag name can be included in a string tag associated with the instruction, where the tag name can be associated with data stored in another array in the data store 108. The next time the controller executes the instruction, the instruction can locate the other tag name in the string tag. The controller 102 can reference the tag associated with the data associated with the other array. Thus, spanning multiple tags and different memory arrays with the same instruction can all be accomplished dynamically at runtime.

Further, multiple tags can be spanned to access data in different structure members. For example, a controller 102 can include code that can further include an instruction, to access data to/from different structure members (e.g., data members) in data store 108. A string tag can be included in the instruction, where a tag name can be stored in the data included in the string tag. The tag name can be associated with data and/or a memory space within a first structure member in the data store 108 where the data can be accessed. When the controller 102 executes the instruction to access the data, the instruction can locate the tag name in the string tag. The controller 102 can reference the tag from a symbol table in controller 102 to determine which structure member (e.g., the first structure member) to access dynamically at runtime. Subsequently, another tag name can be included in a string tag associated with the instruction, where the tag name can be associated with another structure member stored in the data store 108. The next time the controller executes the instruction, the instruction can locate the other tag name in the string tag. The controller 102 can reference the tag name to determine its associated structure member. The associated structure member can then be retrieved from data store 108. The other structure member can be in the same array as the first structure member, or can be in a different array from the first structure member. Thus, spanning multiple tags and different structure members with the same instruction can all be accomplished dynamically at runtime.

As further example, the disclosed subject matter can facilitate spanning multiple scopes to access elements associated respectively with each scope dynamically at runtime by referencing tag names included in tag string data. Controller 102 can, for example, execute an instruction to access data associated with a tag associated with a pusher-control program associated with a first program scope, where the name of the tag and its associated program name (e.g., scope) can be included in a string tag. The data associated with the tag can be referenced by the tag management component 110, and the associated data can be retrieved from the data store 108. Controller 102 can then execute the instruction to access disparate data associated with a disparate tag associated with a machine control program (e.g., controlling conveyors) of a disparate program scope, where the name of the disparate tag and the name of the disparate scope (e.g., program name) can be included in a string tag. The data associated with the disparate tag can be referenced by the tag management component 110, and the associated disparate data can be retrieved from the data store 108. Thus, the controller 102 can span beyond accessing data associated with pusher-related tags of one program scope to access data associated with conveyor-related tags in a different scope. This can be advantageous as it may be desirable for the pusher program to know whether a conveyor operating in associating with the pusher program is running in order for the pusher program to determine what action to take.

It is to be appreciated that data received by the interface 104 can relate to any data utilized by the controller 102 and/or an automation environment. With respect to the controller 102, data can take the form of individual bits that represent an on or off state, numeric values in the form of integers and/or floating point, text strings stored as individual characters (e.g., represented by ASCII codes, etc.). Data can be associated with data types that can include formats such as Boolean, short integers, integers, double integers, long integers, and real numbers, for example. The access component 106 can receive such data and allow the exposure of any name (and corresponding data space) to allow the use of such data within an automation environment and/or data space based on such received data. Data associated with the controller 102 can be structured into components and/or portions, wherein each partition and/or section can include a name. The access component 106 can allow a portion of data within a data space (reference by a name) to be utilized in a disparate data space with a disparate name yet still maintaining the core functionality of such data.

It is to be noted that a controller (e.g., PLC) can be a dedicated piece of hardware that is self contained or, in the case of a "soft controller" (e.g., "soft PLC"), a piece of software that runs on a computer and provides controller-like control. For instance, in the case of a soft controller, code can be extracted by the soft controller to access a project database directly to extract name information.

It is to be appreciated that the controller 102 can be associated with another device(s) (also referred to as the automation device(s)), which can be, but is not limited to, an HMI, a computer, a disparate controller, a roller, a station, a welder, a scanner, a belt conveyor, a pusher, a pump, a press, a fan, a photo eye, etc., or any other suitable device utilized in automation systems. Furthermore, the automation device can be controlled by the controller 102. It is to be appreciated that the controller 102 can contain software components and hardware components having inputs and/or outputs that can be utilized in connection with automating an industrial manufacturing device/process. In addition, it is to be understood that the access component 106 can enhance programmability for a plurality of controllers, and for the sake of brevity throughout the subject innovation, a single controller 102 is depicted but the disclosed subject matter is not so limited.

With further regard to the data store 108, data store 108 can store names and other information related to any suitable entity that can be utilized within an automation environment such as, but not limited to, a task (e.g., executable fragments, etc.), a program (e.g., buckets of code, etc.), a routine (e.g. chunk of code, etc.), a controller, a component, a portion of code utilized by a controller, a module, an I/O module, a network, a drive, a motion axis, a trend, a structure, a tag, an object, and a modular controller component.

The data store 108 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 108 of the subject systems and methods is intended to comprise, without being limited to, these and any other suitable types of memory. In addition, it is to be appreciated that the data store 108 can be a server, a database, a hard drive, and the like.

Moreover, the system 100 can include any suitable and/or necessary interface component 104, which can provide various adapters, connectors, channels, communication paths, etc. to integrate the access component 106 into virtually any operating and/or database system(s). In addition, the interface component 104 can provide various adapters, connectors, channels, communication paths, etc., that provide for interaction with the access component 106.

Figure 2:
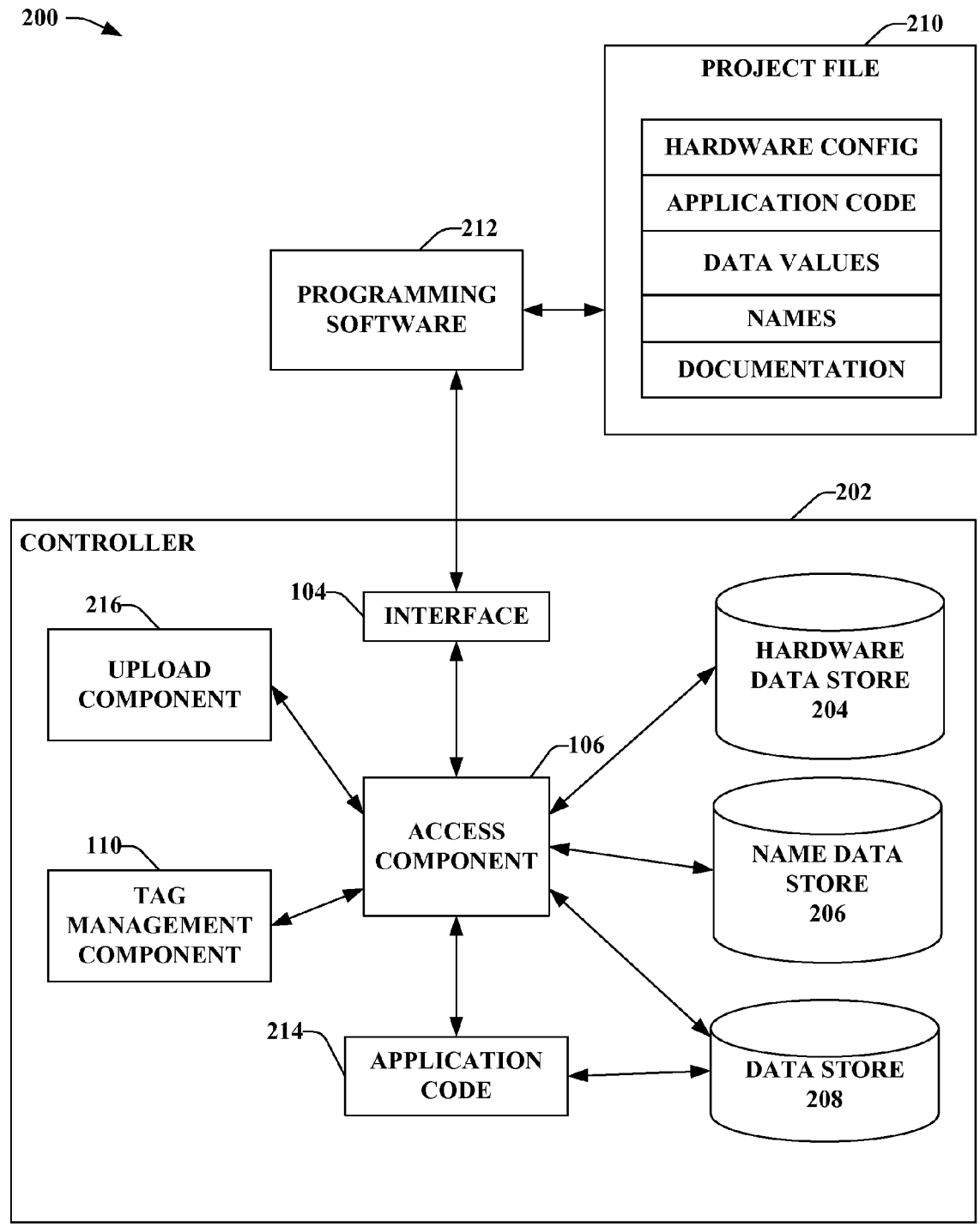
FIG. 2 illustrates another block diagram of a system that facilitates access of data within a controller in accordance with the disclosed subject matter.

FIG. 2 illustrates a system 200 that facilitates employing programmatic access to data in a controller during runtime. The system 200 can include a controller 202 (e.g., PLC) that can include an interface component 104 (hereinafter referred to as "interface") that can facilitate sending data to another device or receiving data from another device to the controller 202. The controller 202 can further include an access component 106 that can facilitate access of data to/from a plurality of data stores included in the controller 202. The plurality of data stores can include a first data store 204 that can store hardware configuration (e.g., also referred to as hardware data store), a second data store 206 that can provide tag data storage (e.g., also referred to as tag data store), and a third data store 208 can provide data storage.

System 200 can further include a project file 210 that can include, but is not limited to, a hardware configuration, application code, data values, names, documentation, etc. The tag information, code, and data can all originate via the project file 210 that can be loaded into the controller 202. It is to be appreciated that programming software 212 can utilize at least one of the project file 210 and/or the controller 202. Furthermore, at runtime, the code in the controller 202 can utilize the access component 106 to read the tag information in the tag data store 206 to be used to access data associated with a tag that can be stored in data store 208. In other words, the access component 106 can provide programmatic access to the tag data storage 206 and data store 208 dynamically during runtime. Application code 214 within the controller 202 can facilitate the execution of instruction and can utilize data to base at least one of a control decision, create message text strings, be read by an HMI (not shown) for use on displays, etc. The controller 202 can further include an upload component 216 that can facilitate the extraction of data values in the plurality of data stores 204, 206, 208, and the code from the controller 202 to re-generate the project file 210 in the programming software 212. Further, the upload component 216 can facilitate extracting program instructions that are compiled and loaded into the memory of the controller 202, and upload or offload that information back up to the programming software 212 so that the actual source code associated with the program instructions can be re-generated.

System 200 can also include a tag management component 110 that can facilitate associating a tag name with a memory space in the data store 208 where the data can be accessed (e.g., read, written) by the access component 106. The tag management component 110 can generate a tag object with a name that can be associated with data being written to or read from the data store 208 within the controller 202 (e.g., PLC). The tag management component 110 can also facilitate associating or linking the tag object and name with the memory space in the data store 208 where the data is accessed (e.g., read, written) by the access component 106. The tag object can be configured such that it has a name (e.g., tag name) and attributes (e.g., data type) associated with it, as well as information regarding the physical location of the associated data in data store 208. Information associated with the tag object and name can be stored in the tag data store 206. For example, data associated with a particular tag object and name can be stored in data store 208. Information regarding the association of the data with the tag object, such as the physical location of the memory space (e.g., address) in data store 208 where the data is stored, can be stored in tag data store 206. At runtime, controller 202 can execute an instruction that can include the name (e.g., in ASCII characters) associated with the tag object in data in the string tag associated with the instruction. The access component 106 can locate or perceive the tag name in the string tag and can employ the tag management component 110 to reference the tag name in a data table to determine from which memory space in data store 208 to retrieve the data associated with the tag name. Thus, data associated with a tag can be accessed indirectly from data store 208 by referencing the tag, as opposed to referencing the actual physical memory space associated with the data.

In accordance with one aspect of the disclosed subject matter, the tag management component 110 can facilitate indirect access of data in the controller 102 dynamically at runtime. Thus, not only can the controller 202 access data associated with another controller (not shown) or device (not shown) at runtime, but the controller 202 can indirectly access (e.g., read, write) data in the controller 202 itself dynamically at runtime. For example, code can be written that can include an instruction that specifies a read or write request be targeted at the controller 202. A string tag associated with the instruction can include a tag name associated with data, for example. During runtime, the controller 202 can scan the instruction, and the instruction can be executed such that the tag name can be located in the string tag data. The tag name can then be referenced from, for example, a symbol table to determine where in the data store 208 the desired data is located (e.g., for a read request) or should be stored (e.g., for a write request). The symbol table, and information associated therewith, can be associated with the tag management component 110 and stored in the tag data store 206, and can include information associating or linking the tag object (and tag name) to the data and/or the physical memory space where the data is being read from or written to, as well as information related to attributes (e.g., data type) associated with the data, for example. The data can be accessed dynamically at runtime by the access component 106 to/from the memory space in the data store 208 associated with the tag name and data. Thus, the access component 106 can thereby indirectly access data associated with the tag dynamically at runtime using the tag name and performing a runtime lookup of information associated with the tag name. Further, the access component 106 has the ability to indirectly read any tag, whether controller scope or program scope, in the controller 202.

As an example indirectly accessing data via an instruction directed to the controller 202 itself, if there are twenty conveyors (not shown) that are controlled by the controller 202, it may be desirable to create a table that contains the names of elements of interest regarding the conveyors. During runtime, when an instruction including the name(s) is executed, the access component 106 can perceive the name and the tag management component 110 can reference the name and look up the information associated with the tag name in the tag data store 206. Such information can be used to facilitate writing/reading the associated data to/from the associated physical memory address in data store 208. Now, if it is desired to expand the number of conveyors to twenty-five, it is not necessary to go offline to modify the code and instructions to recognize the new conveyors. Instead, code associated with the five new conveyors can be added, and the instruction (e.g., message instruction) can be extended so the five new conveyors are recognized by the controller 202.

As a further example, system 200 can leverage the ability to indirectly access data in the controller 102 itself using tag names provided by an outside source (e.g., HMI, an Information Technology database, a disparate system, or a disparate controller). For example, an HMI (not shown) can be utilized to facilitate setting string tag data values with tag names, where the tag names can be inputted into the HMI and then written into the string tag. The HMI can provide the string tag to the controller 202. The access component 106 can reference the tag name(s) stored in the string tag data. The tag management component 110 can reference a look up table (e.g., symbol table, data table) to retrieve the information associated with the tag name(s), so that the data can be accessed to/from the physical memory address associated with the tag.

In accordance with yet another aspect of the disclosed subject matter, multiple tags can be spanned dynamically at runtime to access data in different tags, structures and/or arrays using the same instruction. For example, code can be written that can include an instruction, for example, a message instruction to access data to/from a data store 208. A string tag can be included in the instruction, where a tag name can be stored in a string tag. The tag name, and the tag object associated therewith, can be associated with data, a structure member, and/or a physical memory space in a first array within the data store 208 where the data can be accessed. When the controller 202 executes the instruction to access the data, the instruction can locate the tag name in the string tag data. The controller 202 can reference the tag from the symbol table associated with the tag management component 110 to determine what location (and array) in the data store 208 to access the data associated with the tag. The symbol table and information associated therewith can be stored in the tag data store 206, and can include information associating or linking the tag object (and tag name) to the data and/or the physical memory space where the data is being read from or written to, as well as information related to attributes (e.g., data type) associated with the data, for example. The access component 106 can then access (e.g., read, write) the associated data from/to the data store 208. Thus, as a result, the data can be accessed dynamically at runtime.

Subsequently, a different tag name can be included in a string tag associated with the instruction, where the tag name, and tag object associated therewith, can be associated with data, structure member, and/or a physical memory space in another array in the data store 208. The next time the controller executes the instruction, the instruction can locate the other tag name in the string tag data. The controller 202 can reference the tag name, and thus the associated tag object, from the symbol table associated with the tag management component 110 to determine what location (and array) in the data store 208 to access the data associated with the tag. The access component 106 can then access (e.g., read, write) the associated data from/to the memory location of the other array in data store 208. Thus, a single block of code and an instruction can facilitate spanning multiple tags to access different pieces of data stored in different arrays in data store 208 dynamically at runtime, for example.

As further example, the disclosed subject matter can facilitate spanning different scopes to access elements associated respectively with each scope dynamically at runtime by referencing tag names included in tag string data. Controller 202 can, for example, execute an instruction to access data associated with a tag associated with a first program and first program scope, where the name of the tag and its associated program name (e.g., first scope) can be included in a string tag. The data associated with the tag can be referenced by the tag management component 110, and the associated data can be retrieved from the data store 208. Controller 202 can then execute the instruction to access disparate data associated with a disparate tag associated with a disparate program and a disparate program scope, where the name of the disparate tag and disparate program name (e.g., disparate scope) can be included in a string tag. The data associated with the disparate tag can be referenced by the tag management component 110, and the associated disparate data can be retrieved from the data store 208. Thus, the controller 202 can span beyond accessing data associated with tags of one program scope to also access data associated with different tags of a different scope.

It is to be appreciated that the disclosed subject matter associated with FIG. 1, particularly with regard to controllers, controller components, memory, arrays, data types, tags, etc. is applicable with regard to aspects of the disclosed subject matter associated with FIG. 2.

Figure 3:
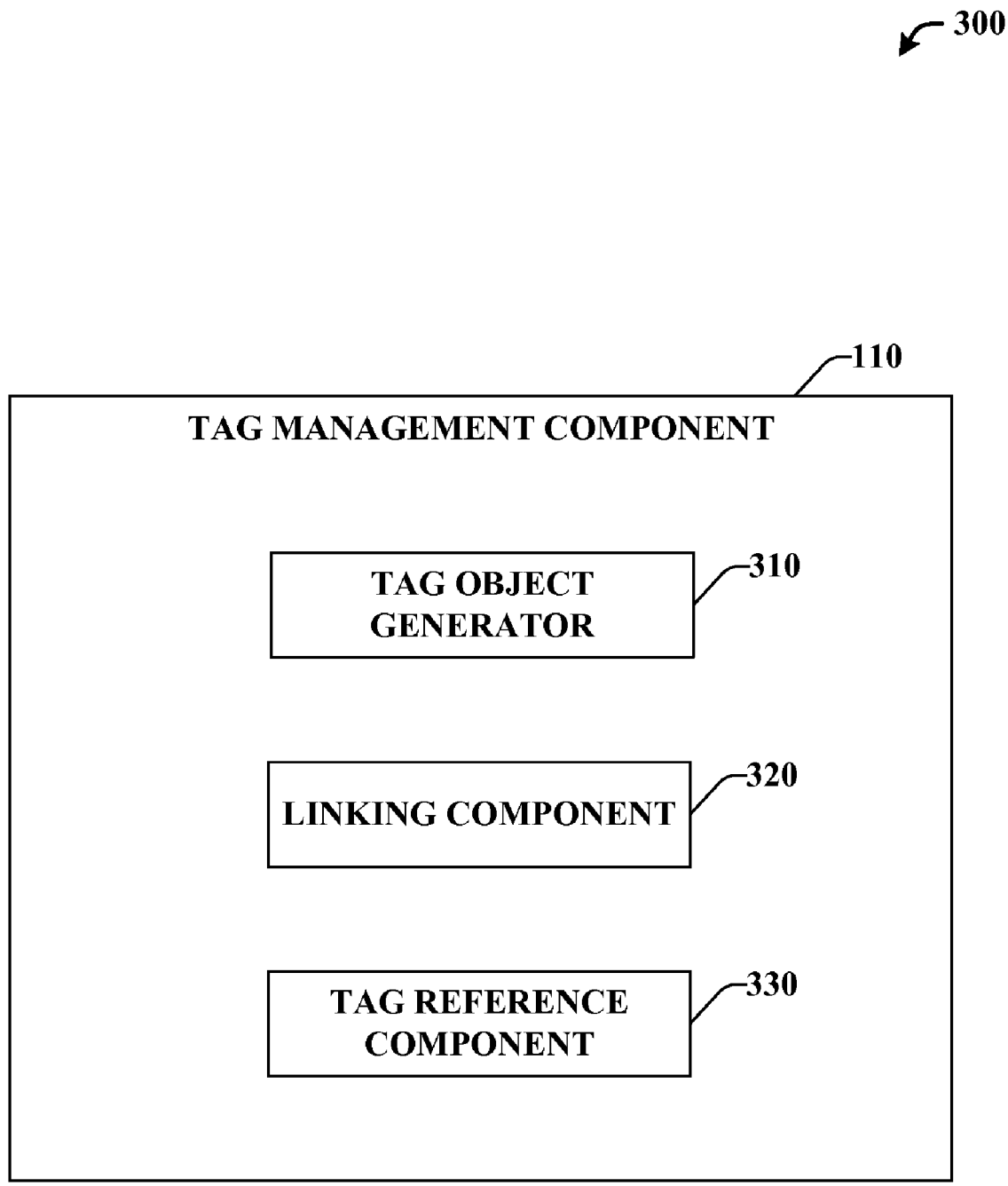
FIG. 3 illustrates a block diagram of a tag management component in accordance with the disclosed subject matter.

FIG. 3 illustrates a block diagram 300 of a tag management component in accordance with the disclosed subject matter. Tag management component 110 can include a tag object generator 310 that can generate a tag object that can be associated with a name (e.g., tag name) for such tag object. The tag object can be associated with data and/or a physical memory location (e.g., address) and can include information associated with the data and/or information associated with the physical memory location where data is stored in memory (e.g., data store 208) in the controller. For example, the tag object can include information such as a data value for a piece of data, attributes (e.g., data type) associated with the data, the memory address where the data can be accessed by the access component (e.g., 106). The tag management component 110 can further include a linking component 320 that can facilitate creating and maintaining a link between the tag name, the tag object, and the data and/or physical memory location where data associated with the tag object is stored. Tag management component 110 can further include a tag reference component 330 that can facilitate the retrieval of information associated with a tag name when an instruction includes such tag name in a string tag associated with the instruction and the instruction is executing. The information associated with the tag name can include information associated with the tag object associated therewith. It is to be appreciated that tag management component 110 can be a stand-alone component, incorporated into the access component 106, incorporated into the controller 202 (or 102), and/or any combination thereof.

Figure 4:
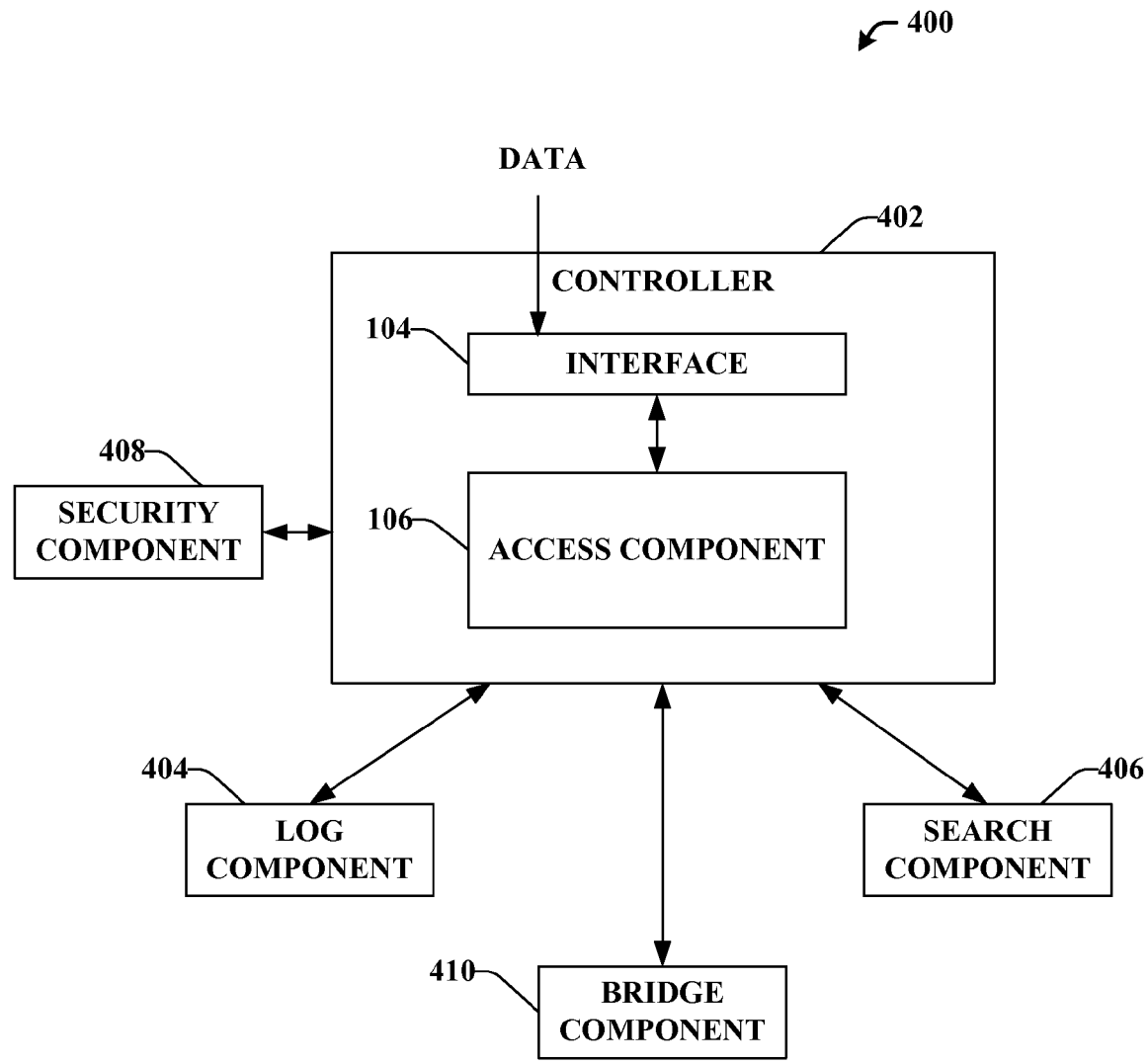
FIG. 4 illustrates a block diagram of a system that facilitates programmatic access of data within an industrial automation environment in accordance with the disclosed subject matter.

FIG. 4 illustrates a system 400 that facilitates programming within an industrial automation environment. The system 400 can include an access component 106 that can facilitate programmatic access of data within a controller 402 dynamically at runtime. For instance, the access component 106 can facilitate indirectly accessing data associated with a tag name (and thereby a tag object) dynamically at runtime using the name of a tag contained within the data of a string tag, where a runtime lookup of information associated with the tag name can be performed to determine where in the memory (not shown) of the controller 402 the associated data can be accessed. As another example, the access component 106 can facilitate spanning multiple tags to access different pieces of data stored in different tags, structures, scopes, and/or arrays in memory (e.g., data store 208) dynamically at runtime using a single block of code and a single instruction. It is to be appreciated that the controller 402 can be substantially similar to controller 202 and controller 102 as discussed above in FIG. 2 and FIG. 1, respectively.

The access component 106 can utilize a log component 404 that tracks variable names within the controller 402. It is to be appreciated that the log component 606 can be a stand-alone component, incorporated into the access component 106, incorporated into the controller 402, and/or any combination thereof. For example, if a user A utilizes the access component 106 to ascertain a variable name, the log component 404 can track the user (e.g., via IP address, network address, user name, computer name, etc.), the date and time, and the variable name accessed. The log component 404 can log various aspects related to receiving tag such as, but not limited to, name changes, name updates, data type changes, physical memory location, edits to names, configuration settings, security settings, time stamps, dates, user names and/or computer names, etc. Moreover, the log component 404 can store the logged entries in a data store (not shown).

The access component 106 can further implement a search component 406 that facilitates querying any data associated with the system 400. The search component 406 can allow a user and/or any component to query to system 400 in relation to tag names, user-defined data types, portions of code, portions of data, etc. For instance, a user can query the system 400 utilizing the search component 406 to find a name of a device and/or data associated with a conveyor utilized by a particular controller within a certain plant facility. In another example, the search component 406 can allow a developer to provide all names associated with devices within a particular sector, and a particular cell, controlled by controller A. It is to be appreciated that a plurality of searches and/or queries can be implemented by the search component 406 and the above examples are not to be limiting on the disclosed subject matter. Moreover, it is to be appreciated that the search component 406 is depicted as a stand-alone component, but the search component 406 can be incorporated into the access component 106, incorporated into the controller 402, a stand-alone component, and/or any combination thereof.

The access component 106 can further utilize a security component 408 that can provide security to the system 400 to ensure data integrity and/or access. In particular, the security component 408 can define security, authorization, and/or privileges in accordance with at least one of a pre-defined hierarchy, security level, username, password, access rights, data importance (e.g., more important data correlates with high security clearance), etc. For instance, a particular name can be a first security level with distinct security authorizations and/or privileges, while a disparate name can have a second security level with disparate security authorizations and/or privileges. Thus, the security component 408 can provide granular security in relation to a tag, a group of tags, tag locations, tag scopes, tag names, tag data, data types, portions of code, etc. It is to be appreciated that there can be various levels of security with numerous characteristics associated with each level and that the subject innovation is not limited to the above example. Moreover, the security component 408 can provide granular security and/or privileges to the system 400. It is to be appreciated that security component 408 can be a stand-alone component, incorporated into the access component 106, incorporated into the controller 402, and/or any combination thereof.

The access component 106 can further include a bridge component 410 that can facilitate networking within an industrial automation environment. In other words, the bridge component 410 can act as a network bridge. It is to be appreciated that the bridge component 410 can be a stand-alone component, incorporated into the access component 106, incorporated into the controller 402, and/or any combination thereof. Thus, data carried by disparate networks can be manipulated so that it conforms to a common network. Accordingly, the bridge component 410 can recognize a network protocol associated with received instructions related to the controller 402 and perform operations to convert such data so that it conforms to a pre-defined protocol. Upon such conversion, a mapping can be employed to convert the data so that it conforms to a hierarchically structured data model (rather than data models associated with flat namespaces). The mapping can thereafter provide hierarchically structured data to a requester of such data over a network, wherein the network conforms to the pre-defined protocol. For instance, the first network protocol can be at least one of Fieldbus, Profibus, Hart, Modbus, ASI-bus, and Foundation Fieldbus, while the second network protocol can be a Common Industrial Protocol (CIP).

Figure 5:
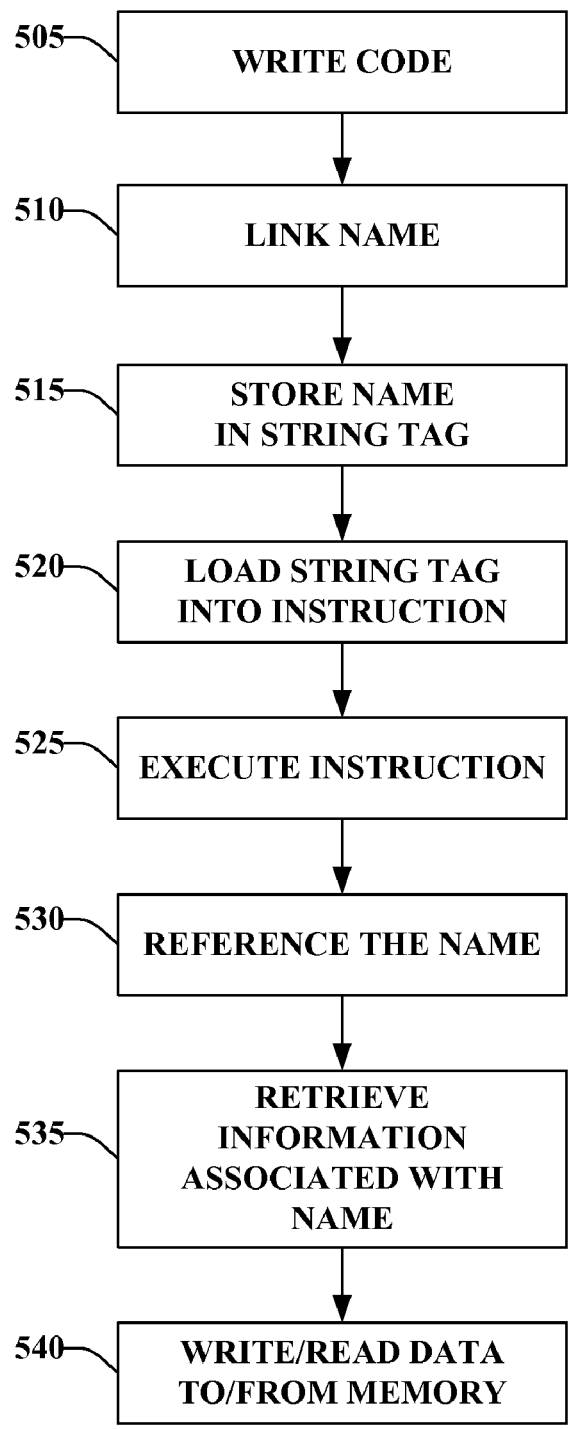
FIG. 5 illustrates a methodology for accessing data within a controller in accordance with the disclosed subject matter.
Figure 6:
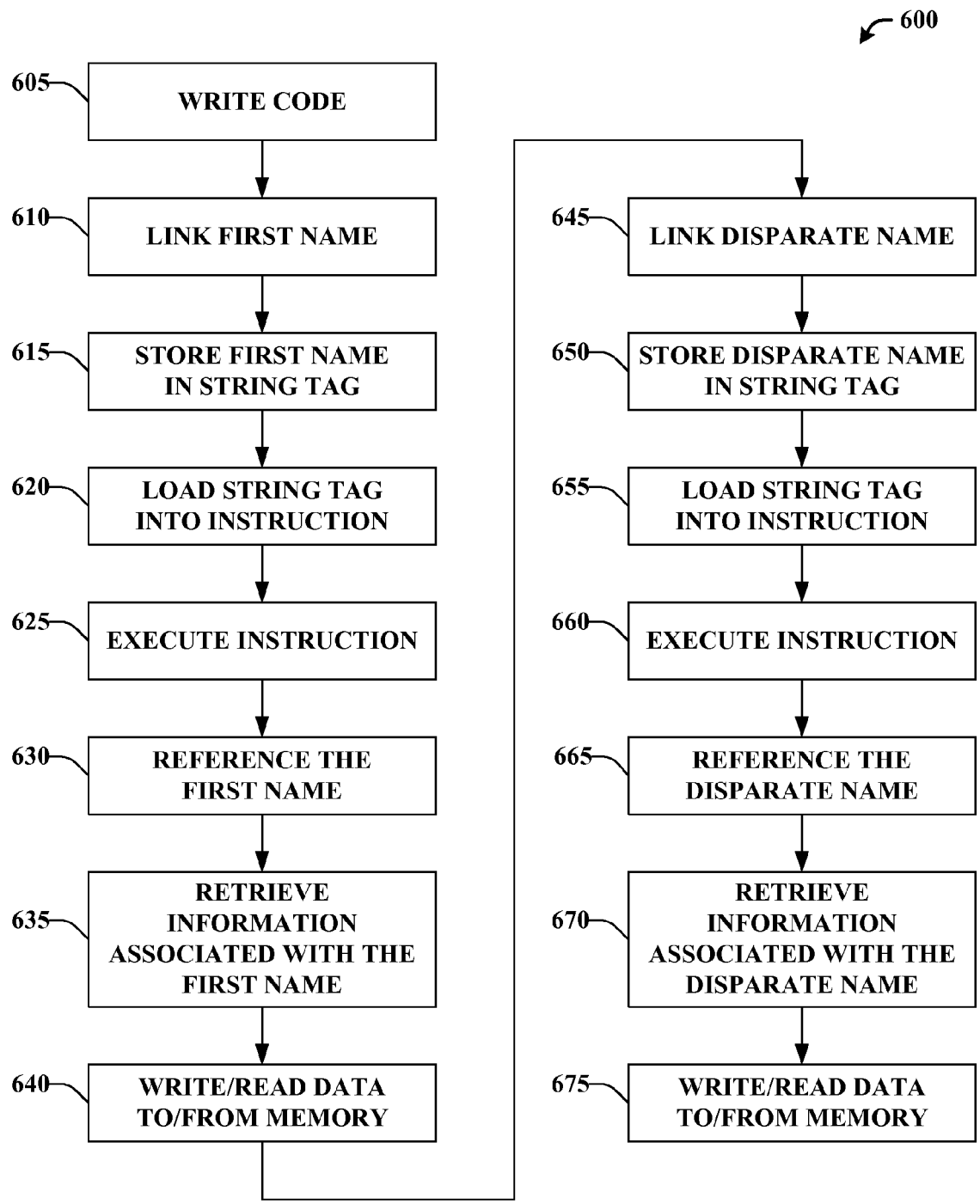
FIG. 6 illustrates a methodology for accessing items of data respectively associated with different structures or memory arrays in accordance with the disclosed subject matter.
Figure 7:
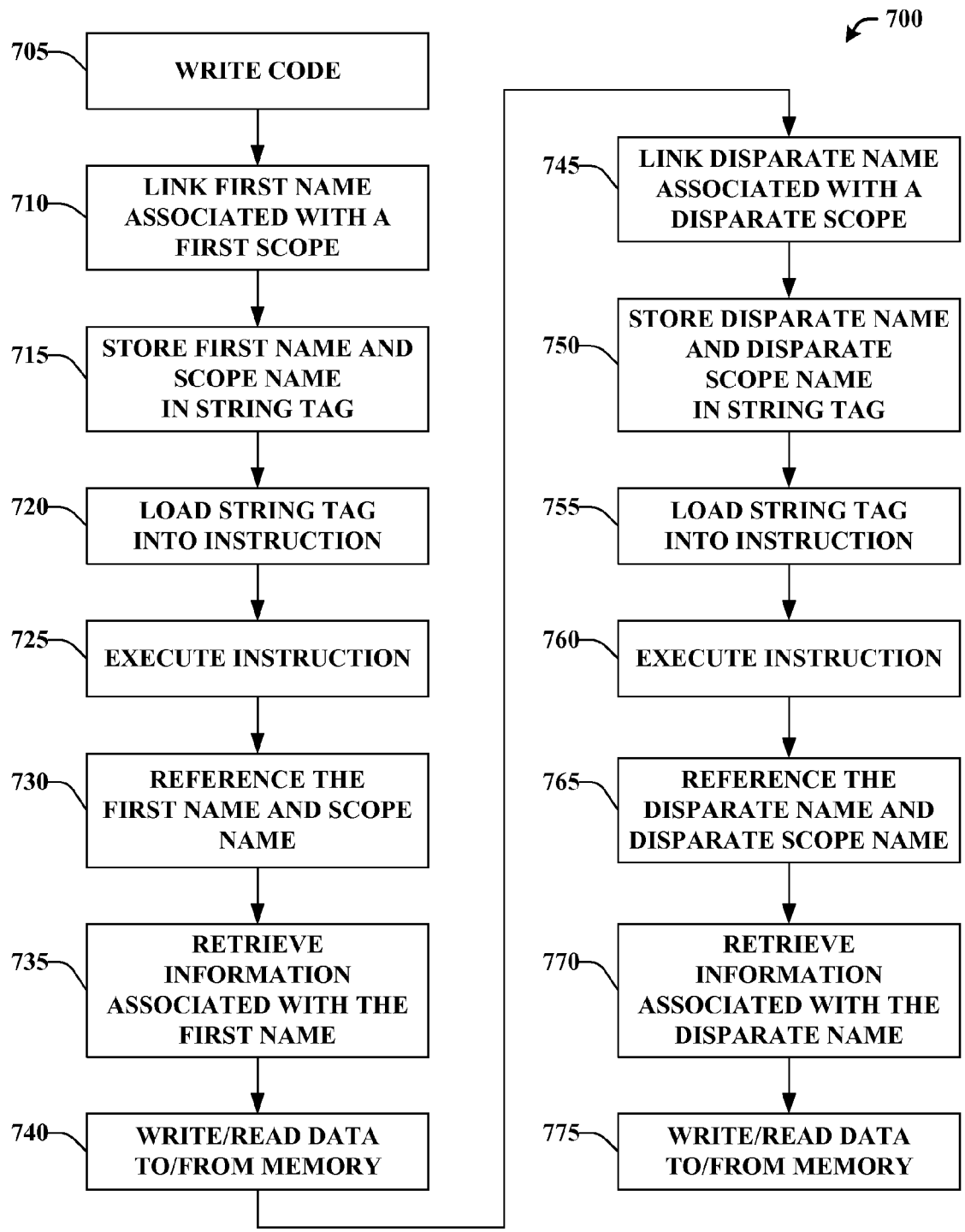
FIG. 7 illustrates a methodology for accessing different pieces of data associated with different scopes dynamically at runtime in accordance with the disclosed subject matter.

Referring to FIGS. 5-7, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning specifically to FIG. 5, a methodology 500 is illustrated for indirectly accessing data associated with a name dynamically at runtime by referencing the name contained in the data of a string tag. At reference numeral 505, code can be written to facilitate the performing of one or more operations by a controller, where the controller can be a PLC, for example. At reference number 510, a tag name can be linked or associated with a tag object, data and/or a physical memory space in the memory (e.g., data store) of the controller, as well as all information associated therewith. At reference numeral 515, the tag name can be stored or written in the data of a string tag. At reference numeral 520, the string tag, which can contain the tag name therein, can be loaded and/or stored and/or written into an instruction associated with the code. The instruction can be associated with a read or write request, or in other words, an access request, such as, for example, a message instruction. Further, the instruction can be directed to the controller itself, that is, the controller that will be executing the instruction, or the instruction can be directed to another device (e.g., a disparate controller, HMI, a computer, a roller, a station, a welder, a scanner, a belt conveyor, a pusher, a pump, a press, a fan, a photo eye, etc.). At reference numeral 525, the instruction can be executed in or by the controller. At reference numeral 530, the access component can reference the tag name in the data of a string tag in the instruction. Referencing the tag name can facilitate looking up the tag name in a symbol table stored in memory (e.g., tag data store 206) in the controller, for example, to locate information associated with the tag name, such as information related to the associated tag object, data and/or physical memory space in the memory (e.g., data store) in the controller. At reference numeral 535, information associated with the tag name can be retrieved from memory (e.g., tag data store 206) in the controller. At reference numeral 540, a write request or read request associated with data and/or the physical memory space and/or the tag object, associated with the tag name, can be performed to, with regard to a write request, write data to the associated physical memory space in the memory (e.g., data store 208) in the controller, or, with regard to a read request, read data from the associated physical memory space in the memory (e.g., data store 208) in the controller.

FIG. 6 illustrates a methodology 600 that facilitates spanning multiple tags to access different pieces of data associated with different tags, structures, or arrays in memory dynamically at runtime. At reference numeral 605, code can be written to facilitate the performing of one or more operations by a controller, where the controller can be a PLC, for example. At reference numeral 610, a first tag name can be linked or associated with a tag object, data and/or a physical memory space in the memory (e.g., data store) of the controller, as well as all information associated therewith. The first tag name can further be associated with a first structure (e.g., data member) and/or a first array. At reference numeral 615, the first tag name can be stored or written in a string tag data. At reference numeral 620, the string tag, which can contain the first tag name therein, can be loaded and/or stored and/or written into an instruction associated with the code. The instruction can be associated with a read or write request, or in other words, an access request, such as, for example, a message instruction. Further, the instruction can be directed to the controller itself, that is, the controller that will be executing the instruction or the instruction can be directed to another device (e.g., a disparate controller, HMI, a computer, a roller, a station, a welder, a scanner, a belt conveyor, a pusher, a pump, a press, a fan, a photo eye, etc.). At reference numeral 625, the instruction can be executed in or by the controller. At reference numeral 630, the first tag name can be referenced. For example, the access component can initiate referencing the first tag name included in the string tag in the instruction. Referencing the first tag name can include looking up the first tag name in a symbol table (or look-up table) stored in memory (e.g., tag data store 206) in the controller, for example, to locate information associated with the first tag name, such as information related to the associated tag object, data and/or physical memory space in the memory (e.g., data store) in the controller. At reference numeral 635, information associated with the first tag name can be retrieved from memory (e.g., tag data store 206) in the controller. As stated, the information or data can be associated with a first structure or first array, associated with the memory. At reference numeral 640, a write request or read request associated with data and/or the physical memory space and/or the tag object, associated with the first tag name, can be performed to, with regard to a write request, write data to the associated physical memory space in the memory (e.g., data store 208) in the controller, or, with regard to a read request, read data from the associated physical memory space in the memory (e.g., data store 208) in the controller.

At reference numeral 645, a disparate tag name can be linked or associated with a disparate tag object, disparate data and/or a disparate physical memory space in the memory (e.g., data store) of the controller, as well as all information associated therewith. The first tag name can further be associated with a first structure (e.g., data member) and/or a first array. At reference numeral 650, the disparate tag name can be stored or written (e.g., in ASCII form) as data included in a set of data in a string tag. At reference numeral 655, another string tag, which can contain the disparate tag name therein, can be loaded and/or stored and/or written into the instruction associated with the code. The code can be the same code associated with the first tag name, or can be different code. The instruction can be the same instruction as the instruction associated with the first tag name, or it can be a different instruction. The instruction can be associated with a read or write request, or in other words, an access request, such as, for example, a message instruction. Further, the instruction can be directed to the controller itself, that is, the controller that will be executing the instruction or the instruction can be directed to another device (e.g., a disparate controller, HMI, a computer, a roller, a station, a welder, a scanner, a belt conveyor, a pusher, a pump, a press, a fan, a photo eye, etc.). At reference numeral 660, the instruction can be executed in or by the controller. At reference numeral 665, the disparate tag name can be referenced, where the access component can initiate the referencing, for example. Referencing the disparate tag name can include looking up the disparate tag name in a symbol table (or look-up table) stored in memory (e.g., tag data store 206) in the controller, for example, to locate information associated with the disparate tag name, such as information related to the associated disparate tag object, disparate data and/or disparate physical memory space in the disparate array in the memory (e.g., data store) in the controller. At reference numeral 670, information associated with the disparate tag name can be retrieved from memory (e.g., tag data store 206) in the controller. As stated, the information or data can be associated with a disparate structure or disparate array, associated with the memory. At reference numeral 675, a write request or read request associated with the disparate data and/or the disparate physical memory space and/or the disparate tag object, associated with the disparate tag name, can be performed to, with regard to a write request, write the disparate data to the associated disparate physical memory space in the memory (e.g., data store 208) in the controller, or, with regard to a read request, read the disparate data from the associated disparate physical memory space in the memory (e.g., data store 208) in the controller.

FIG. 7 illustrates a methodology 700 that facilitates spanning multiple tags to access different pieces of data associated with different scopes dynamically at runtime. At reference numeral 705, code can be written to facilitate the performing of one or more operations by a controller, where the controller can be a PLC, for example. At reference numeral 710, a first tag name, associated with a first scope (e.g., program scope), can be linked or associated with a tag object, data and/or a physical memory space, as well as all information associated therewith. The data can be stored in the memory (e.g., data store) of the controller. At reference numeral 715, the first tag name and its associated program name, which can be associated with a first scope, can be stored or written in string tag data (e.g., data included in a string tag). At reference numeral 720, the string tag, which can contain the first tag name (e.g., ASCII characters representative of the first tag name) and associated program name, can be loaded and/or stored and/or written into an instruction associated with the code. The instruction can be associated with a read or write request, or in other words, an access request, such as, for example, a message instruction. Further, the instruction can be directed to the controller itself, that is, the controller that will be executing the instruction or the instruction can be directed to another device (e.g., a disparate controller, HMI, a computer, a roller, a station, a welder, a scanner, a belt conveyor, a pusher, a pump, a press, a fan, a photo eye, etc.). At reference numeral 725, the instruction can be executed in or by the controller. At reference numeral 730, the first tag name and program name can be referenced. For example, the access component can initiate referencing the first tag name and program name included in the string tag in the instruction. Referencing the first tag name and program name can include looking up the first tag name and program name in a symbol table (or look-up table) stored in memory (e.g., tag data store 206) in the controller, for example, to locate information associated with the first tag name and program name, such as information related to the associated tag object, data and/or physical memory space in the memory (e.g., data store) in the controller. At reference numeral 735, information associated with the first tag name and program name can be retrieved from memory (e.g., tag data store 206) in the controller. At reference numeral 740, a write request or read request associated with data and/or the physical memory space and/or the tag object, associated with the first tag name and program name, can be performed to, with regard to a write request, write data to the associated physical memory space in the memory (e.g., data store 208) in the controller, or, with regard to a read request, read data from the associated physical memory space in the memory (e.g., data store 208) in the controller.

At reference numeral 745, a disparate tag name, associated with a disparate scope (e.g., disparate program scope), can be linked or associated with a disparate tag object, disparate data and/or a disparate physical memory space, as well as all information associated therewith. At reference numeral 750, the disparate tag name can be stored or written (e.g., in ASCII form) as data included in a set of data in a string tag. At reference numeral 755, another string tag, which can contain the disparate tag name and associated disparate program name, which can be associated with a disparate scope, therein, can be loaded and/or stored and/or written into the instruction associated with the code. The code can be the same code associated with the first tag name, or can be different code. The instruction can be the same instruction as the instruction associated with the first tag name, or it can be a different instruction. The instruction can be associated with a read or write request, or in other words, an access request, such as, for example, a message instruction. Further, the instruction can be directed to the controller itself, that is, the controller that will be executing the instruction or the instruction can be directed to another device (e.g., a disparate controller, HMI, a computer, a roller, a station, a welder, a scanner, a belt conveyor, a pusher, a pump, a press, a fan, a photo eye, etc.). At reference numeral 760, the instruction can be executed in or by the controller. At reference numeral 765, the disparate tag name and disparate program name can be referenced, where the access component can initiate the referencing, for example. Referencing the disparate tag name and disparate program name can include looking up the disparate tag name and disparate program name in a symbol table (or look-up table) stored in memory (e.g., tag data store 206) in the controller, for example, to locate information associated with the disparate tag name and disparate program name, such as information related to the associated disparate tag object, disparate data and/or disparate physical memory space in the memory (e.g., data store) in the controller. At reference numeral 770, information associated with the disparate tag name and disparate program name can be retrieved from memory (e.g., tag data store 206) in the controller. At reference numeral 775, a write request or read request associated with the disparate data and/or the disparate physical memory space and/or the disparate tag object, associated with the disparate tag name and disparate program name (e.g., of a disparate scope), can be performed to, with regard to a write request, write the disparate data to the associated disparate physical memory space in the memory (e.g., data store 208) in the controller, or, with regard to a read request, read the disparate data from the associated disparate physical memory space in the memory (e.g., data store 208) in the controller.

As used in this application, the terms "component" and "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Figure 8:
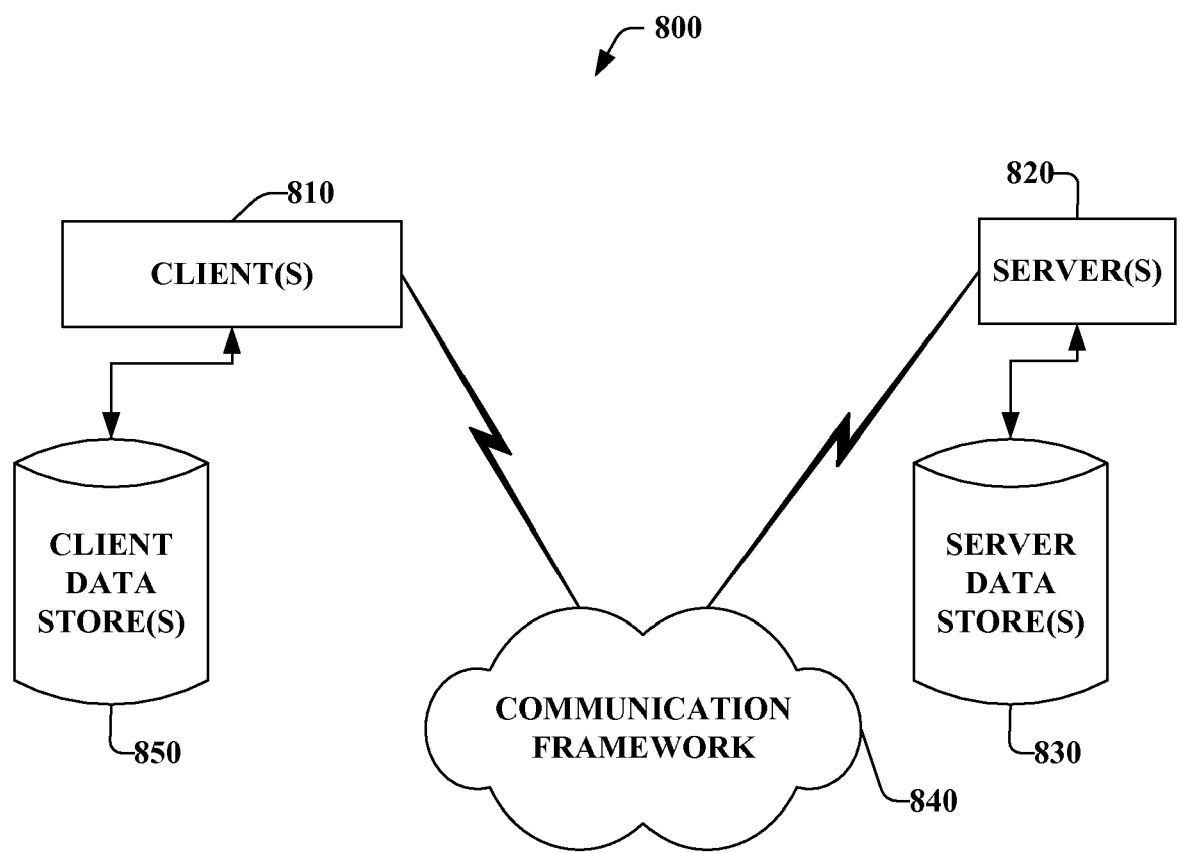
FIG. 8 illustrates a networking environment, wherein the aspects of the disclosed subject matter can be employed in accordance with the disclosed subject matter.
Figure 9:
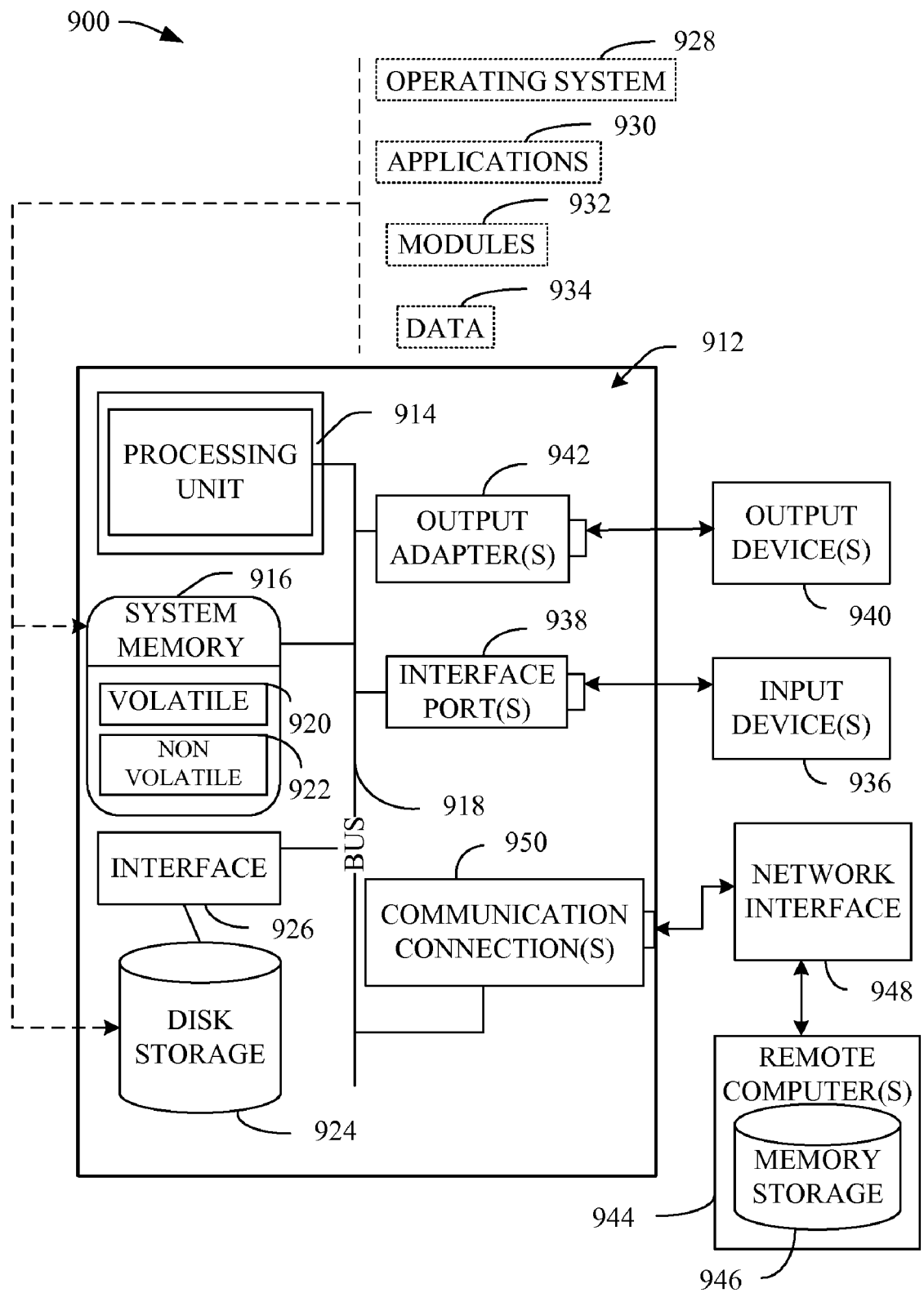
FIG. 9 illustrates an operating environment that can be employed in accordance with the disclosed subject matter.

In order to provide additional context for implementing various aspects of the claimed subject matter, FIGS. 8-9 and the following discussion is intended to provide a brief, general description of a suitable computing environment in which the various aspects of the subject innovation may be implemented. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 8 is a schematic block diagram of a sample-computing environment 800 with which the claimed subject matter can interact. The system 800 includes one or more client(s) 810. The client(s) 810 can be hardware and/or software (e.g., threads, processes, computing devices). The system 800 also includes one or more server(s) 820. The server(s) 820 can be hardware and/or software (e.g., threads, processes, computing devices). The servers 820 can house threads to perform transformations by employing the subject innovation, for example.

One possible communication between a client 810 and a server 820 can be in the form of a data packet adapted to be transmitted between two or more computer processes. The system 800 includes a communication framework 840 that can be employed to facilitate communications between the client(s) 810 and the server(s) 820. The client(s) 810 are operably connected to one or more client data store(s) 850 that can be employed to store information local to the client(s) 810. Similarly, the server(s) 820 are operably connected to one or more server data store(s) 830 that can be employed to store information local to the servers 820.

With reference to FIG. 9, an exemplary environment 900 for implementing various aspects of the claimed subject matter includes a computer 912. The computer 912 can include a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable programmable ROM (EEPROM), or flash memory. Volatile memory 920 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 912 also includes removable/non-removable, volatile/non-volatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in the suitable operating environment 900. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that the claimed subject matter can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940, which require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates utilizing data within a controller, comprising:
a processor;
a memory communicatively coupled to the processor, the memory having stored therein computer-executable instructions configured to implement the system, including:
a tag management component that creates a link between a variable tag name and at least one of data, a tag object, or a physical memory space and maintains first information regarding the link in a symbol table, the tag management component storing one or more characters representing the variable tag name in a string tag and loading the string tag in an instruction associated with code to be executed within the controller;
an access component integrated within the controller and associated with the tag management component that facilitates execution of the instruction in the controller, the access component referencing the variable tag name in the symbol table and retrieving second information pertaining to the at least one of the data, the tag object, or the physical memory space associated with the variable tag name dynamically at runtime based on the information regarding the link maintained in the symbol table.

2. The system of claim 1, the controller is a programmable logic controller.

3. The system of claim 1, the instruction is directed to the controller, and the physical memory space is located in a memory in the controller.

4. The system of claim 3, the instruction facilitates accessing data to or from a physical memory space associated with at least one of a first tag, a first structure, or a first array in a memory, and facilitates accessing disparate data to or from at least one disparate physical memory space associated with at least one of a second tag, a second structure, or a second array in the memory dynamically at runtime.

5. The system of claim 4, the instruction is executed using a single block of code.

6. The system of claim 1, the access component facilitates accessing data associated with a first tag, the first tag associated with a first scope, and facilitates accessing disparate data associated with a second tag, the second tag associated with a disparate second scope, dynamically at runtime.

7. The system of claim 6, wherein the string tag is generated by a device that is external to the controller, the device is at least one of an HMI, an Information Technology database, a disparate system, or a disparate controller.

8. The system of claim 1, further comprising a link component that links the variable tag name and a scope associated with the variable tag name to the at least one of the data, the tag object, or the physical memory space.

9. The system of claim 1, further comprising a security component that provides at least one of authorization or data integrity during access of data within the controller.

10. A method that facilitates accessing data within an industrial controller, comprising:
employing a processor executing computer-executable instructions stored on a computer-readable medium to implement the following acts:
generating code associated with at least one of a data write request or a data read request;
linking a first name to at least one of a first tag object, first data, or a first physical memory address in a memory within the industrial controller;
storing the first name in a first string tag;
loading the first string tag in an instruction associated with the code;
executing the instruction within the industrial controller;
referencing the first name in a symbol table, the symbol table comprising linking information associated with the first name and the at least one of the first tag object, the first data, or the first physical address; and
retrieving from the memory first information associated with the first name, the first information comprising at least information associated with the at least one of the first tag object, the first data, or the first physical memory address.

11. The method of claim 10, wherein the retrieving comprises retrieving the first information from at least one of a first structure, a first array, or a first scope.

12. The method of claim 10, further comprising:
performing the at least one of the data write request or the data read request; and
accessing at least one of the first data, the first tag object, or the first physical memory space within the memory dynamically at runtime.

13. The method of claim 11, further comprising:
linking a second name to at least one of a second tag object, second data, or a second physical memory address in the memory the second name is associated with at least one of a second structure, a second array, or a second scope;
storing the second name in data associated with a second string tag; and
loading the second string tag in the instruction.

14. The method of claim 13, further comprising:
executing the instruction within the programmable logic controller;
referencing the second name in the symbol table, the symbol table comprising information associated with the second name and the at least one of the second tag object, the second data, or the second physical memory address; and
retrieving from the memory second information associated with the second name, the second information comprising at least information associated with the at least one of the second tag object, the second data, or the second physical memory address in the memory.

15. The method of claim 14, further comprising:
performing the at least one of the data write request or the data read request; and
accessing at least one of the second data, the second tag object, or the second physical memory space within the memory dynamically at runtime.

16. The method of claim 11, wherein the referencing comprises referencing the first name in the symbol table dynamically at runtime.

17. The method of claim 10, further comprising:
utilizing a human machine interface to load the first name into the first string tag.

18. A system embodied on a computer-readable storage medium that facilitates accessing data in an industrial controller, comprising:
means for linking a first name with a first tag object;
means for associating the first tag object with first data in a memory in the industrial controller;
means for writing the first name in a string tag;
means for associating the string tag with an instruction;
means for executing the instruction;
means for identifying the first name in the string tag;
means for identifying the first name in a symbol table;
means for retrieving the first data associated with the first tag object linked to the first name; and
means for at least one of reading the first data from or writing the first data to the memory dynamically at runtime.

19. The system of claim 18, further comprising means for storing information linking the first name with the first tag object and with the first data within the symbol table.

20. The system of claim 18, further comprising:
means for linking a second name with a second tag object, the second name is associated with at least one of a second structure, a second array, or a second scope, and the name is associated with at least one of a first structure, a first array, or a first scope;
means for associating the second tag object with second data in the memory in the industrial controller;
means for identifying the second name in the symbol table;
means for retrieving the second data associated with the second tag object linked to the second name; and
means for at least one of reading the second data from or writing the second data to the memory dynamically at runtime.

* * * * *